W. AND J. O. WISHART.
PROCESS AND APPARATUS FOR MAKING ICE.
APPLICATION FILED FEB. 26, 1918.
1,392,385.
Patented Oct. 4, 1921.
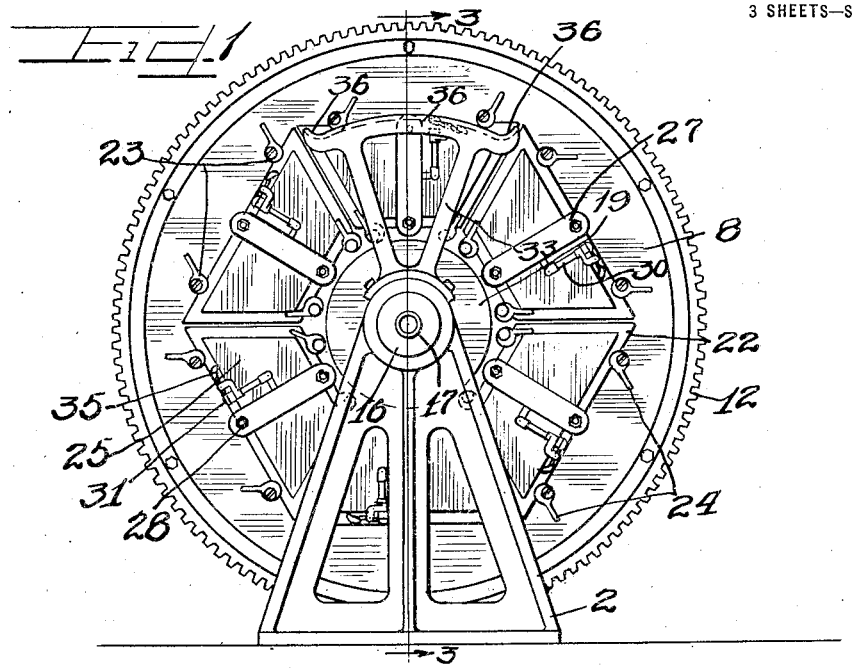
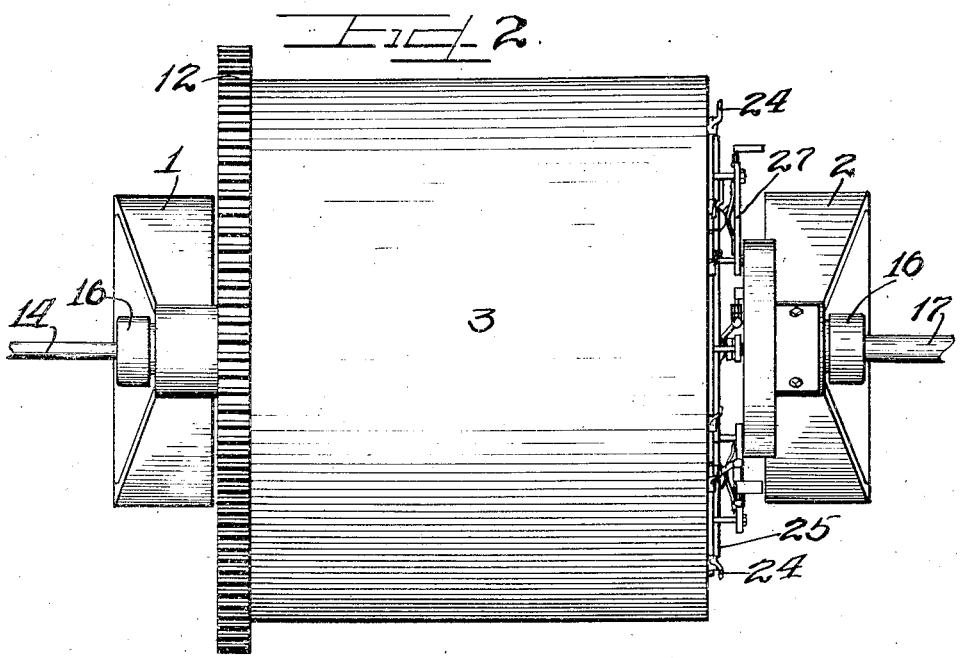

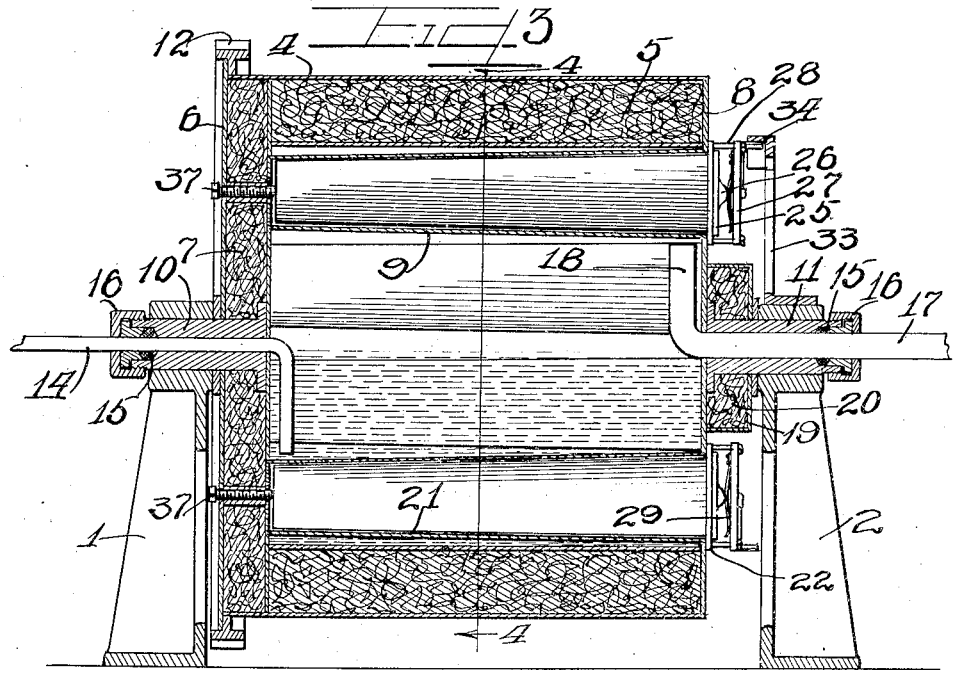
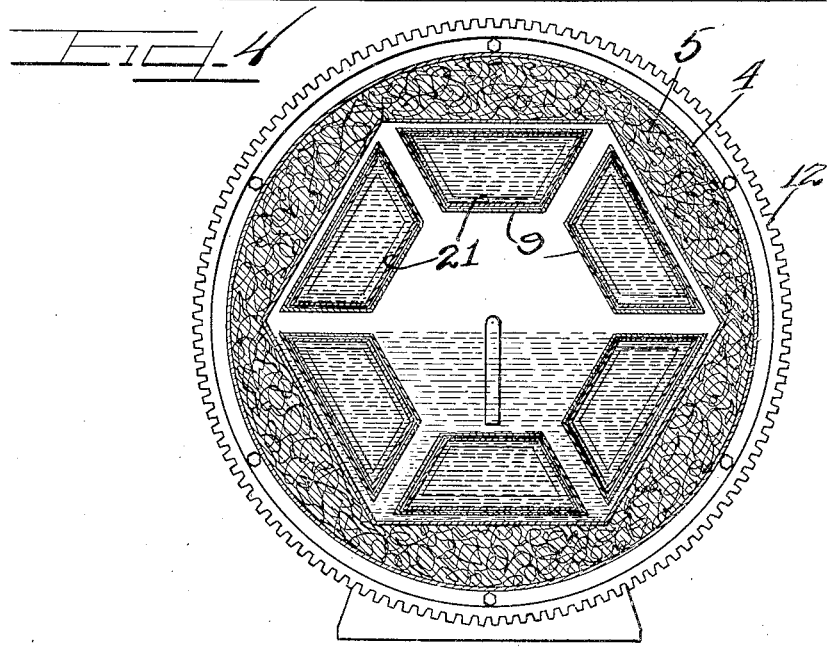

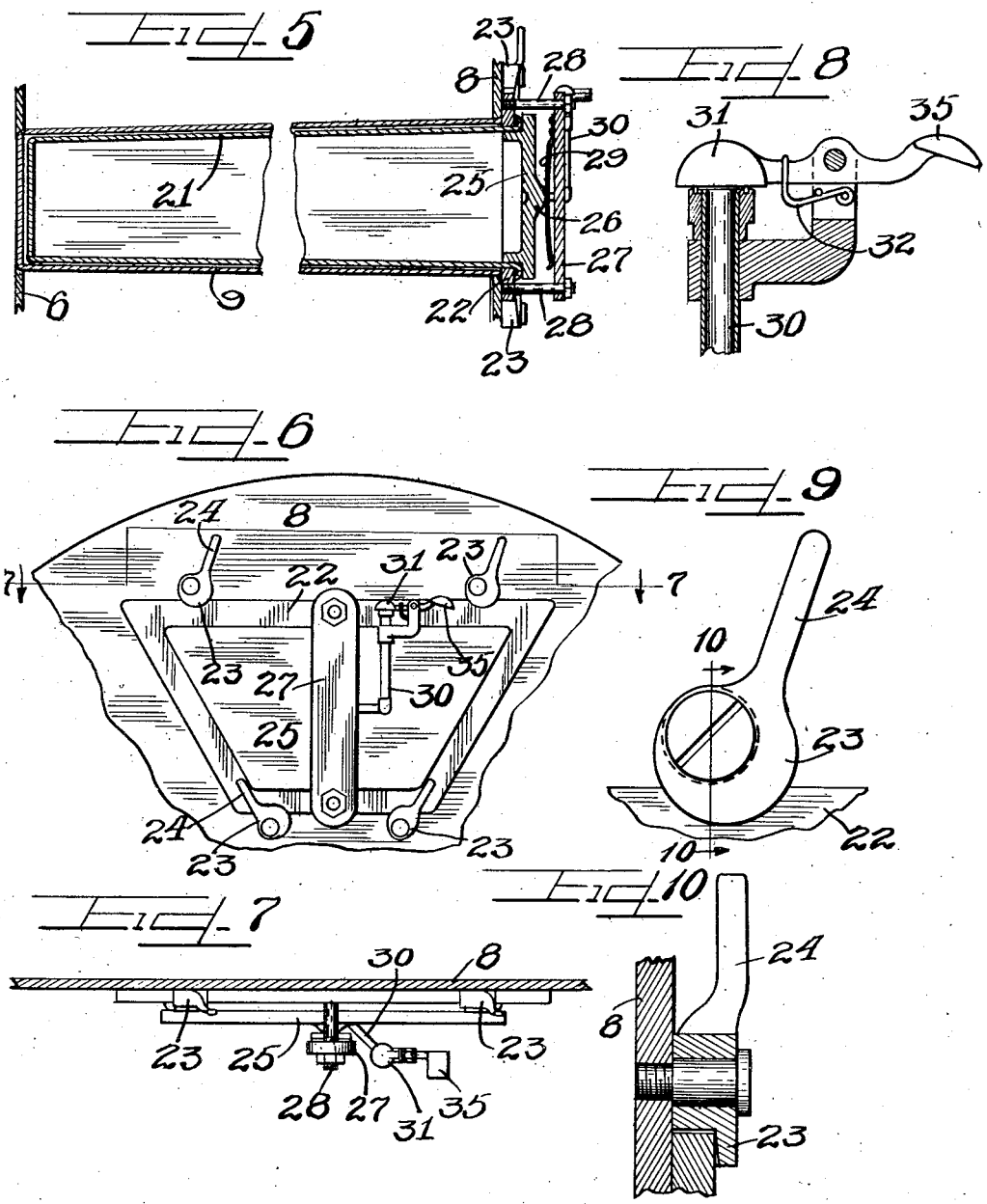

UNITED STATES PATENT OFFICE.

WILLIAM WISHART AND JOHN O. WISHART, OF CLINTON, IOWA, ASSIGNORS TO CLINTON REFRIGERATING COMPANY, OF CLINTON, IOWA, A CORPORATION OF IOWA.

PROCESS AND APPARATUS FOR MAKING ICE.

1,392,385.  Specification of Letters Patent.  Patented Oct. 4, 1921.

Application filed February 26, 1918. Serial No. 219,212.

*To all whom it may concern:*

Be it known that we, WILLIAM WISHART and JOHN O. WISHART, citizens of the United States, and residents of the city of Clinton, in the county of Clinton and State of Iowa, have invented a certain new and useful Process and Apparatus for Making Ice; and we do hereby declare that the following is a full, clear, and exact description of the same, reference being had to the accompanying drawings, and to the numerals of reference marked thereon, which form a part of this specification.

This invention has reference more particularly to a process and machine for rapidly making ice by applying the expansive refrigerant directly to the compartments containing the water to be frozen.

An object of the invention is to provide a process and apparatus for making ice wherein the water to be frozen is subjected directly to the cooling action of the expansive refrigerant.

A further object of the invention is to provide a process and apparatus for making ice in which the water to be frozen is constantly agitated during the cooling thereof, whereby the temperature of the water is reduced more effectively and uniformly and a better cake of ice is produced.

A further object of the invention is to provide a process and apparatus for making ice whereby the water is perfectly and uniformly frozen and the imperfectly frozen or snowy center which is usually found in cakes of artificial ice is avoided.

Another object of the invention is to provide an ice making process and apparatus whereby the refrigerant liquid is constantly agitated and the walls of the compartments containing the water to be frozen are kept saturated with the refrigerant liquid which evaporates thereon and thereby rapidly reduces the temperature of the water in the compartments.

A further object of the invention is to provide a process and apparatus for making ice whereby provision is made for the expansion of the water immediately preceding crystallization and the pressure developed in the water container as a result of such expansion is prevented from interfering with the uniform freezing of the water.

Another object of the invention is to provide an ice-making machine with containers for the water to be frozen which are provided with means for automatically relieving the pressure developed in the container during the process of freezing.

Another object of the invention is to provide a machine with a plurality of revolving compartments for containing the water to be frozen, and which as they are rotated are subjected to the refrigerant liquid.

Our invention also has other objects which will be apparent from the following description and the accompanying drawings.

Our invention (in a preferred form) is illustrated in the accompanying drawings and described in the following specification.

On the drawings:

Figure 1 is a front end view of an ice-making machine embodying our invention.

Fig. 2 is a top view thereof.

Fig. 3 is a sectional view on the line 3—3 of Fig. 1.

Fig. 4 is a sectional view on the line 4—4 of Fig. 3.

Fig. 5 is an enlarged longitudinal sectional view of the container wherein the water is frozen.

Fig. 6 is an enlarged end view of the cover for the water container.

Fig. 7 is a sectional view on the line 7—7 of Fig. 6.

Fig. 8 is an enlarged sectional view of the vent pipe and automatic valve for the water container.

Fig. 9 is an enlarged view of the cam lever for securing the water container in the machine.

Fig. 10 is a sectional view on line 10—10 of Fig. 9.

As shown on the drawings:

The reference numerals 1 and 2, indicate standards or supports which are suitably spaced and have the freezing drum 3, mounted to rotate therein. This drum is adapted to contain the refrigerant for freezing the water and the annular wall of periphery 4, of the drum, is hollow and filled with an insulating material indicated at 5, and the rear end wall 6, is also hollow and filled with insulating material 7, so that the temperature within the cylinder may be maintained at a low degree without being affected by the temperature outside of the cylinder. The front of the cylinders is closed by means of the plate 8, which has a series of trapezoidal openings arranged around the outer edge thereof immediately inside the insulated wall 4, which said openings provide access to the longitudinal compartments 9, which taper gradually from the wall 8, to the opposite insulated wall 6. These compartments 9, are secured to the end walls 8 and 6, so that the drum 3, is securely sealed so as to hold a refrigerant liquid therein, and the compartments are suitably spaced from one another and from the outer wall of the drum so as to provide circulating space entirely around each compartment 9.

There is a trunnion 10, secured axially to the rear wall 6, of the drum and a similar trunnion 11, secured axially to the front wall 8, of the drum, which said trunnions are journaled in the upper ends of the standards 1 and 2, so that the drum may be revolved, and the rear wall 6, of the drum is provided with the ring gear 12, which may be engaged and driven by a pinion for rotating the drum. The drum is adapted to contain and serve as an expansion chamber for the refrigerant liquid which is supplied to the drum through the inlet pipe 14, which extends through the trunnion 10, and has the packing material 15, compressed therearound by means of the nut 16, engaging the threaded end of the trunnion 10, so as to prevent leakage around the pipe 14. The opposite trunnion 11, has the outlet pipe 17, extended therethrough and packed against leakage in a similar manner and the inner end 18, of this outlet pipe is turned upwardly as shown so as to have the opening thereinto safely above the level of the refrigerant liquid in the drum and thereby obviate the liability of liquid being withdrawn therefrom, and for the further purpose of exhausting the vapor resulting from the evaporation of the refrigerant liquid from the upper part of the drum where it is rarefied or expanded to the greatest extent. This outlet pipe 17, is also preferably larger than the inlet pipe 14, to accommodate the increased volume of the refrigerant in its evaporated or vaporized form which it assumes after it has been introduced into the drum 3, and the end of the inlet pipe 14, is turned down inside the drum to dip into the refrigerant liquid as shown and prevent communication of the refrigerant vapor with the pipe 14. The central portion of the front end wall 8, may be provided with a hollow wall 19, if desired filled with insulating material 20, to maintain the temperature in the drum.

A plurality of containers or cans 21, conforming to the inside of the compartments 9, and somewhat smaller so that they may be inserted therein, are provided to contain the water to be frozen, and the outer end of each can has a rim 22, secured thereto which is adapted to abut against the end wall 8, of the drum when the can 21, is inserted in position. A plurality of cam levers 23, are pivoted to the front wall 8, of the drum around each opening thereof into the compartments 9, and these cam levers have an inclined under surface which may be brought to bear by means of the handle 24, against the outer face of the rim 22, so as to clamp the rim tight against the end wall 8, and thereby hold the can 21, securely in the compartment 9. These cans 21, are adapted to be filled with water which is to be frozen and are provided with removable covers 25, having a central boss 26, on the outer side. A plate 27, is adjustably secured to the rim 22, by means of the bolts 28, and has the spring 29, on the under face thereof, which when the plate 27, is drawn down by means of the bolts 28, bears against the boss 26, on the outer surface of the cover plate 25, and holds the cover securely in position.

It will be seen from the foregoing that as the drum 3, is rotated by means of the gear 12, the containers 21, are correspondingly rotated and the water therein will be constantly and uniformly agitated by such rotation until it reaches a degree of solidity which will prevent further agitation. Furthermore, the continual dipping of the compartments in the refrigerant liquid, the level of which is approximately as shown, not only promotes evaporation of the refrigerant, but also keeps the walls of the compartments saturated with the liquid which evaporates thereon and results in rapid cooling of the water in the compartments.

As the temperature of the water in the can 21, nears the point of freezing, there is a certain amount of expansion and the pressure of air liberated from the water increases and air bubbles in the ice result unless the air is allowed to escape. To relieve this pressure and permit the escape of the liberated air, a vent pipe 30, is attached to and communicates through the cover plate 25, and has the outer end thereof provided with a valve 31, which is normally held closed by means of the spring 32. Mounted on the top of the standard 2, is a bracket 33, at the upper end of which is a circular flange 34, the under surface of which is adapted to engage the trip-arm 35, with which each of the valves 31 is provided, as they pass under the said flange 34, in the rotation of the drum 3, and the said flange is of suitable length to hold the valves open a sufficient length of time to permit equalization of the pressure inside and outside the container 21, during the process of freezing. The ends of the flange 34, are turned outwardly as shown in Fig. 1, so that the trip-lever 35, will be readily drawn thereunder and so that it will be gradually released as the trip-lever passes from under the flange 34.

The spring 29, which holds the cover plate 25, in position is of sufficient strength to normally hold the cover 25, securely closed, but is adapted, when the water freezes to permit the necessary expansion of the freezing ice in the container 21, which will take place against the tension of the spring 29.

The operation is as follows:

The inlet pipe 14, is connected with a suitable refrigerating machine which is adapted to furnish the refrigerant in liquid form and maintain a supply thereof in the lower part of the drum 3, and the exhaust pipe 17, is of suitable size and connected with the suction side of the compressor or otherwise so as to withdraw the vapor of the refrigerant from the drum and maintain a constant process of evaporation therein.

The containers or cans 21, are removed from the drum and filled completely with water whereupon the covers 25, are applied and clamped firmly against the ends of the cans 21 so as to prevent escape of water therefrom. The cans are then inserted in the compartments 9, of the drum and clamped in place by turning the cam levers 23. The drum 3, is then rotated by means of the ring gear 12, and the compartments 9, with the cans of water therein, are rotated and passed through the refrigerant liquid within the drum, and the constant evaporation of the liquid refrigerant in the drum and on the surfaces of the compartments 9, extracts the heat from the water and rapidly reduces the temperature thereof. As the water cools there is a contraction thereof down to a point near to that at which crystallization takes place, which reduction in temperature tends to reduce the pressure within the can. The revolution of the drum, however, constantly moves the trip levers 35, under the flange 34, and temporarily opens the valves 31, and permits an equalization of the pressure inside the cans and outside the drum. The continuing rotation of the drum 3, and subjecting of the compartments containing the cans 21, of water, to the evaporating refrigerant further reduces the temperature and at a point slightly above the temperature at which freezing takes place, there is a slight expansion of the water which continues until it is frozen. This creates a pressure in the cans 21, which is effectively resisted by the springs 29, which hold the covers 25, securely closed, and if this pressure is maintained, the air liberated from the water forms air bubbles in the ice and results in the snowy or imperfectly frozen portions usually found in blocks of artificial ice. However, in our machine, relief is provided for this pressure, and the liberated air is permitted to escape through the vent pipes 30, the valves of which are automatically opened periodically and equalize the pressure inside the cans 21, and outside the drum and enable a perfectly clear cake of ice to be made. When the water in a can 21, is thoroughly frozen, the can of ice is removed from the drum which operation may be assisted by turning the screw 37, which is threaded through the rear end wall of the drum and adapted to bear against the inner end of the can 21. The cake of ice may be removed from the can 21, in the usual manner after which the can is again filled with water and the operation repeated.

For the purpose of illustration we have shown our invention embodied in a certain form, but we are aware that various changes may be made and details of construction varied through a wide range without departing from the principles of this invention. We therefore do not purpose limiting the patent granted otherwise than necessitated by the prior art.

We claim as our invention:

1. The process of making ice which consists in partially filling a vaporizing receptacle with a volatile refrigerant liquid, placing the water to be frozen in a rotatable compartment in the receptacle, replenishing the volatile refrigerant liquid in the receptacle and exhausting the vapor therefrom, rotating the compartment so that it is periodically immersed in and withdrawn from the liquid in the receptacle, and permitting the escape of air from the compartment as it is rotated to relieve the pressure therein.

2. The process of making ice which consists in sealing the water to be frozen in a container, applying a cooling medium thereto to withdraw the heat therefrom, and periodically venting the container to equalize the pressure inside and outside the container.

3. The process of making ice which consists in sealing the water to be frozen in a container, applying a cooling medium thereto to withdraw the heat therefrom and simultaneously agitating the water in the container, and periodically venting the container to equalize the pressure inside and outside the container.

4. In an ice-making machine, the combination of a revoluble drum, having a refrigerant liquid chamber therein, a plurality of removable containers adapted to be inserted in the drum and subjected to action of the refrigerant liquid therein, and means for ejecting the containers from the drum.

5. In an ice-making machine, the combination of a receptacle, means for supplying a refrigerant liquid to the receptacle, a plurality of removable containers for liquid to be frozen in the receptacle, and valved means communicating with the interior of said containers.

6. In an ice-making machine, the combination of a receptacle, means for supplying a refrigerant liquid to the receptacle, a plurality of containers for liquid to be frozen inserted in the receptacle, ventilator pipes communicating with the interior of said containers, valves for the ventilator pipes, and means for periodically operating the said valves.

7. In an ice-making machine, the combination of a revoluble receptacle, means for supplying a refrigerant liquid to the interior of the receptacle, a plurality of removable containers for liquid to be frozen inserted in the receptacle, a spring pressed cover for the containers, a valve controlling communication with the interior of the container, and a contact member for temporarily operating the valve.

8. In an ice-making machine, the combination of a receptacle, means for supplying a refrigerant liquid to the receptacle, a plurality of containers for liquid to be frozen inserted in the receptacle, and threaded means for expelling the containers from the receptacle.

9. In an ice-making machine, the combination with a receptacle, of means for supplying a refrigerant to the receptacle, a plurality of freezing liquid containers removably engaged in said receptacle, air outlet valves mounted on said containers, and means for automatically operating said valves.

10. In a machine of the class described, the combination with a container for holding a liquid to be frozen, of an automatic venting mechanism associated with said container.

11. In a machine of the class described, the combination with a container for holding a liquid to be frozen, of a venting mechanism mounted thereon, and means for operating said venting mechanism.

In witness whereof we have hereunto subscribed our names in the presence of two subscribing witnesses.

WILLIAM WISHART.
JOHN O. WISHART.

Witnesses:
L. F. SUTTON,
A. M. COOPER.